Patented Apr. 14, 1942

2,279,800

UNITED STATES PATENT OFFICE 2,279,800

STABILIZATION OF INSECTICIDES

William P. ter Horst, Packanack Lake, N. J., assignor, by mesne assignments, to United States Rubber Company, New York, N. Y., a corporation of New Jersey No Drawing. Application October 14, 1938, Serial No. 234,958

5 Claims. (Cl. 167—24)

This invention relates to stabilization of insecticide materials.

It is known that insecticide material such as that commonly known as derris powder which is made by grinding derris root (Derris elliptica), rapidly deteriorates when exposed to sun and/or light. The deterioration is accompanied by a corresponding loss in insecticidal power which makes it necessary for one to spray or dust at frequent intervals. The same is true for other insecticidal materials such as, timbo root (Lonchocarpus urucu), cube root (Lonchocarpus utilis), ground pyrethrum flowers, and others. This deterioration also takes place when extracts of these roots are used instead of the ground roots.

It has been found that ketone-amine reaction products are useful as stabilizers for insecticides, particularly the product or products obtained by reacting acetone upon diphenylamine, preferably in the presence of a small amount of catalyst, such as iodine, hydriodic acid or ferrous iodide. The reaction may be carried out in the vapor phase by passing acetone vapor through molten diphenylamine to which a small amount of ferrous iodide has been added, at a temperature of approximately 150° C., or by reacting acetone and diphenylamine in the presence of a catalyst, in an autoclave at a temperature of approximately 250° C. In the former case a light brown powder is obtained, whereas in the latter case, a dark colored viscous liquid results.

The tests described below illustrate the usefulness of these stabilizers.

In Test I, which is the control experiment, untreated derris powder containing 5% of rotenone was used. Toxicity tests were made before and after exposure to direct sunlight.

In Test II, a similar derris powder, however, in addition containing 5% of the solid reaction product of acetone and diphenylamine, was used.

In Test III, a similar derris powder containing 5% of the reaction product of acetone and phenyl-beta-naphthylamine was used. In Tables II, III toxicities were determined only after 18 hours exposure in direct sunlight at six hour intervals. As test organisms, black bean aphids (Aphis rumicis) were used on nasturtiums as the host. The samples were thoroughly mixed at frequent intervals during the exposure period. The insecticides were used in the form of water dispersions containing one pound insecticide per 200 gals. of water.

The plants were sprayed on a turntable, making 15 revolutions per minute. The time of spraying was 30 seconds (15 seconds up, 15 seconds down), and the pressure was 25 lb./sq. in. The mortality was determined 24 hours after spraying.

Test I:
                                                                                 Per cent mortality
  (a) Derris—untreated, unexposed_____ 60.5
  (b) Derris—untreated, exposed 18 hrs__ 13.9

Test II:
  Derris plus 5% stabilizer, exposed 18 hrs_____ 61.1

Test III:
  Derris plus 5% stabilizer, exposed 18 hrs_____ 59.7

The results clearly show how rapidly derris powder deteriorates in sunlight and how these stabilizers maintain the toxicity of 18 hours exposed derris powder.

Also included for the purposes of the invention are ketone-amines derived from ketones other than acetone, such as, for example, from methyl ethyl ketone, diethyl ketone, methyl propyl ketones, methyl butyl ketones, methyl amyl ketones, methyl hexyl ketones, etc. Other amines or amino compounds that may be reacted with any of the ketones for the purposes of the invention are such as phenyl tolylamine, ditolylamine, phenylalpha - naphthylamine, phenyl - xenylamine, dinaphthylamine, etc. Instead of the free amines, their salts, e. g., their hydrochlorides or acetates, may be used.

In preparing the stabilized powder the stabilizer is preferably added prior to or during the grinding of the derris root or the like, although it may instead be added immediately after the grinding.

Having thus described my invention, what I claim and desire to protect by Letters Patent is:

1. An insecticide preparation containing derris root and a stabilizer therefor comprising a solid product of reaction of an aliphatic ketone with a diarylamine.

2. An insecticide preparation containing derris root and a stabilizer therefor comprising a solid product of reaction of acetone with diphenylamine.

3. An insecticide preparation having as an active ingredient a plant insecticide derived from rotenone and pyrethrin containing plants, and a stabilizer therefor which is a solid product of reaction of acetone and a diarylamine.

4. An insecticide preparation containing an insecticide derived from a member of the class consisting of derris root, derris powder, timbo root, cube root, pyrethrum flowers, and as a stabilizer therefor a condensation product of an aliphatic ketone with a secondary aromatic amine.

5. An insecticide preparation containing an insecticide derived from a member of the class consisting of derris root, derris powder, timbo root, cube root, pyrethrum flowers, and as a stabilizer therefor a solid condensation product of an aliphatic ketone with a diarylamine.

WILLIAM P. ter HORST.